Nov. 16, 1954 M. CAMRAS 2,694,656

MAGNETIC IMPULSE RECORD MEMBER, MAGNETIC MATERIAL AND METHOD OF MAKING MAGNETIC MATERIAL

Filed July 25, 1947

Inventor
MARVIN CAMRAS
by The Firm of Charles W. Hills
Attys.

United States Patent Office 2,694,656

Patented Nov. 16, 1954

2,694,656

MAGNETIC IMPULSE RECORD MEMBER, MAGNETIC MATERIAL, AND METHOD OF MAKING MAGNETIC MATERIAL

Marvin Camras, Chicago, Ill., assignor to Armour Research Foundation of Illinois Institute of Technology, Chicago, Ill., a corporation of Illinois Application July 25, 1947, Serial No. 763,486

26 Claims. (Cl. 117—144)

This invention relates to permanent magnet material and to a method of making the same. More particularly, the invention relates to the preparation of ferromagnetic material for use in a magnetic impulse record member comprising a base or carrier, such as a tape, ribbon or the like of non-magnetic material, coated or impregnated with a ferromagnetic track of my magnetic material.

Magnetic sound recorder tapes have heretofore been made with a non-magnetic backing, such as paper, plastic, or the like, and with a coating thereover, or an impregnation thereof, of a magnetic oxide of iron. Magnetic oxides of iron heretofore used for this purpose, however, have not been entirely satisfactory, since such magnetic oxides do not possess magnetic properties particularly suited for magnetic recording purposes. For one thing, prior magnetic oxides of iron have possessed relatively low coercive force values and relatively low energy products. They have also exhibited a rather high $B_{fm}$ to $B_r$ ratio, usually considerably in excess of 3 to 1, whereas a relatively lower ratio gives better sensitivity and frequency response. $B_{fm}$ is expressed in gauss and is equal to maximum (B—H) and is termed the ferric induction. It is also equal to maximum $4\pi I$, where I is the magnetic intensity.

I have now found that it is possible to produce an iron oxide, or mixture of iron oxides, possessing magnetic properties that are much more desirable for magnetic impulse recording purposes. The magnetic material of my invention has a relatively high coercive force value, generally between 200 and 550 oersteds. This gives good high frequency response. My material also begins to saturate at fields as low as of from 400 to 600 gauss, a factor which makes for ease of erasing. In addition, my material has a $B_{fm}$ to $B_r$ ratio of not over 3 to 1 and preferably considerably less, as compared with the higher than 3 to 1 ratio possessed by prior art magnetic iron oxides. This lower ratio gives better sensitivity and frequency response.

In addition, the magnetic material of my invention has a high value of $H_0$, in that the $B_r$—H curve does not rise appreciably until a field of about 250 gauss is reached. $H_0$ is the H value at the point where the $B_r$ vs. H curve begins to rise rapidly. This magnetic characteristic reduces the tendency of the magnetic material to become affected by stray magnetic fields of relatively weak intensity, as for example the stray fields set up by closely arranged turns of the magnetized record member in the reels of a wire or tape recorder. Furthermore, my magnetic material exhibits a steep rise after reaching the $H_0$ value, a characteristic that makes for high recording sensitivity. The linear rise of the steep portion of the curve is responsible for a reduction in the distortion of the recording.

My magnetic material also exhibits a relatively high residual magnetism, $B_r$, which is a factor in improving low-frequency response and output. The combination of a relatively high coercive force, $H_c$, and a relatively high residual magnetism, $B_r$, together with the other desirable properties, has not been found to the best of my knowledge in magnetic iron oxides heretofore known. These, therefore, are properties that distinguish my material magnetically from prior art magnetic materials.

With regard to the physical characteristics of my magnetic material, I have found that in order to obtain the desirable magnetic properties above mentioned, it is preferable to use an iron oxide having a cubic lattice structure and an acicular crystalline structure. While ferric oxide, $Fe_2O_3.H_2O$, in acicular crystalline form is known, such ferric oxide is non-magnetic. I have now found, however, that this non-magnetic ferric oxide can be so treated as to render it magnetic, while still retaining its acicular crystalline form.

When treated in accordance with the method of my present invention, the non-magnetic ferric oxide is transformed into magnetic ferrosoferric oxide, $Fe_3O_4$, which may be used in that form as the magnetic material, or the magnetic ferrosoferric oxide so formed may be reoxidized back to a magnetic ferric oxide. In either case, the materials of my invention are preferably in acicular crystalline form, although other forms can be produced having, in general, similarly desirable magnetic properties. Apparently, the acicular crystalline form of the material is characteristic of the magnetic iron oxides possessing the best magnetic properties.

A further physical characteristic of my magnetic material is its small particle size. By proper control of the process, the crystals of ferric oxide used as the starting material are obtained in the form of uniformly small crystals having a length of the order of 1 to 2 microns. The magnetic material obtained by the further treatment of such ferric oxide in accordance with my present method is also in the form of crystals which in size, are of the same order of magnitude.

The small particle size of my magnetic material is conducive to better uniformity of sound reproduction and to a lower noise level. Furthermore, in the case of the acicular crystalline form of my material, there is a better opportunity of arranging the particles in overlapping relationship when used to coat or impregnate a paper tape, or the like. This, in turn, provides a more continuous and more uniform magnetic coating on the record member.

It is therefore an important object of this invention to provide novel permanent magnet material in the form of magnetic oxides of iron having preferably an acicular crystalline structure and being particularly adapted for use in the coating or impregnating of non-magnetic strip material to form a magnetic impulse record member of unusual efficacy.

It is a further important object of this invention to provide magnetic oxides of iron, including both ferric and ferrosoferric oxides and mixtures thereof, in the form of crystals of very small particle size and having magnetic properties superior to heretofore known magnetic oxides of iron.

It is a further important object of this invention to provide a method of preparing permanent magnet material from non-magnetic ferric oxides of acicular crystalline form to convert such non-magnetic oxides into magnetic oxides of iron having superior magnetic properties for use in the preparation of magnetic impulse record members.

It is a still further important object of this invention to provide a method of preparing magnetic material by the reduction of non-magnetic ferric oxide and to convert the same into magnetic ferrosoferric oxides, which may then be reoxidized to produce a magnetic ferric oxide, both the magnetic ferric and ferrosoferric oxides being in crystalline form of extremely fine particle size and having superior magnetic properties for use in magnetic sound recorders and the like.

Other and further important objects of this invention will be apparent from the disclosures in the specification and the accompanying drawings.

Figure 2:
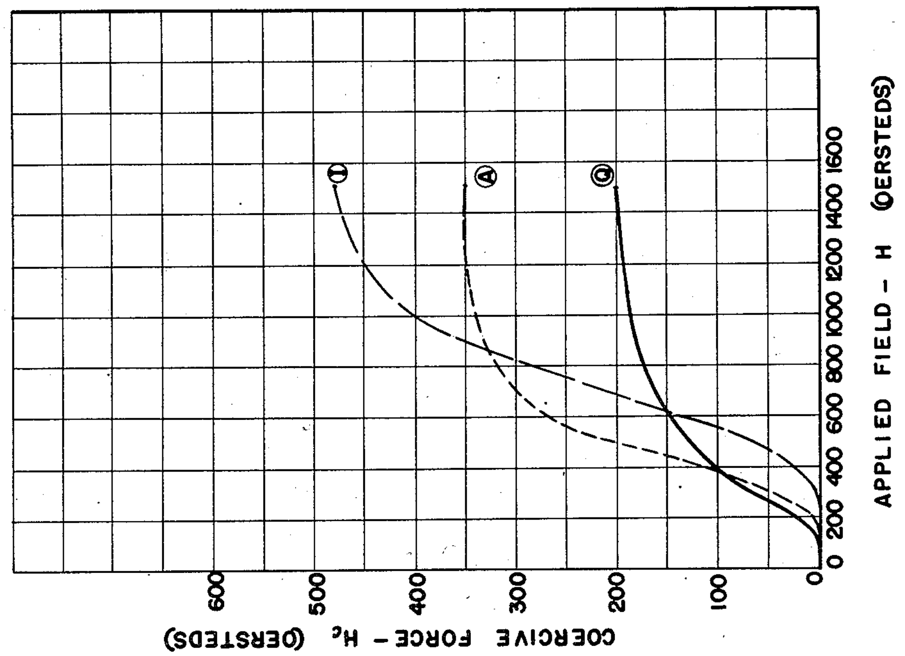
Fig. 2 is a graph of applied field vs. coercive force, $H_c$, for the same samples.

The starting material used in my method is preferably a hydrated ferric oxide, $Fe_2O_3.H_2O$, that exists in acicular crystalline form and which is available commercially. However, since I have found that it is desirable to prepare a fine, acicular crystalline form of ferric oxide especially for use in my method, the following example is given as a preferred method for its preparation:

EXAMPLE I

Three grams of caustic soda (NaOH) were dissolved in 10 grams of water. Twelve parts of copperas, $FeSO_4.7H_2O$, were separately dissolved in 60 grams of water. The caustic soda solution and the ferrous sulphate solution were then mixed in a vessel provided with agitation and the mixture agitated slowly for a number of hours, as for instance 17 hours, while constantly exposing a new surface of the mixture to the atmosphere. The reaction which took place yielded a thick greenish-yellow mass and may probably be expressed as follows:

$$(1)\quad 4FeSO_4.7H_2O+O_2+8NaOH \rightarrow 2Fe_2O_3.H_2O+4Na_2SO_4+30H_2O$$

The $Fe_2O_3.H_2O$ so produced is in colloidal form. The finely divided particles act as nuclei for growing larger crystals of $Fe_2O_3.H_2O$ in accordance with the subsequent steps about to be described.

In a separate vessel, 175 grams of $FeSO_4.7H_2O$ were mixed with 3.5 liters of water, and 1 kilogram of scrap iron was added. This mixture was then heated to 140° F., after which the thick greenish-yellow mass produced by Equation 1 was added and air bubbled through the resulting mass for about four hours, holding the same at about 140° F. The reactions that then occurred may be expressed as follows:

$$(2)\quad 4FeSO_4.7H_2O+O_2 \rightarrow 2Fe_2O_3.H_2O+4H_2SO_4+22H_2O$$
$$(3)\quad H_2SO_4+Fe+7H_2O \rightarrow FeSO_4.7H_2O+H_2$$

The sulphuric acid formed in Equation 2 reacts with the scrap iron in accordance with Equation 3 to renew the amount of ferrous sulphate in solution. More iron may be added as the original iron dissolves.

The $Fe_2O_3.H_2O$ produced in accordance with the foregoing Equation 2 is obtained in the form of light yellow acicular crystals about 1/4 to 1½ microns in length and about 1/10 to 3/10 micron in width. These size determinations were obtained by electron photomicrographs at 5000 magnification. A chemical analysis of the $Fe_2O_3.H_2O$ product showed 86% $Fe_2O_3$, and 12% $H_2O$.

The suspension of $Fe_2O_3.H_2O$ obtained as above described was filtered, washed, and dried at 212° F. This gave a filter cake that could be easily crushed to release the crystals in their original fine state of division. The material so produced was placed in a closed chamber, together with sharp-edged iron lumps to facilitate mixing. Hydrogen was passed through the chamber at a temperature in the chamber of 750° F., and the mixture tumbled until the powder had turned almost black. At this point, the amount of water vapor, which was heretofore being released in large volume, dropped off substantially, indicating that the reaction should then be stopped, since continued treatment beyond this point would result in deterioration of the material.

The material so prepared was then cooled by quenching the chamber with cold water while the gas was still passing through the chamber. Tumbling was continued until the product was at about room temperature before the gas supply was cut off. The chamber was then sealed and tumbled for about 10 minutes, with further cooling, before air was again admitted. If this precaution is not followed, the powder is apt to ignite.

The resulting powder is black and has an acicular crystalline structure. The particle size and shape are as previously described. The chemical analysis shows 78.7% $Fe_3O_4$ and 19.3% $Fe_2O_3$. However, the analysis may vary considerably. The extent of the reduction is indicated by the color of the material, which may vary from a dark brown to a deep black at room temperature.

EXAMPLE II

The product from Example I was mixed with a cellulose acetate binder and applied to a cellulose acetate base in the form of a tape, or ribbon, having a thickness of about 1.5 mils. As applied, the coating of the magnetic material had a thickness of about 1 mil, when dried. The coated strip was then run between calender rolls under a pressure of ten tons. This reduced the coating thickness to 0.5 mil and gave a smooth burnished surface. Magnetic measurements on the coated strip, identified as specimen A, gave the following properties:

Coercive force, $H_c=340$
Residual magnetization:
$B_r=420$ (before calendering)
$B_r=800$ (after calendering)
Maximum induction $-4\pi I$, $B_{fm}=640$ (before calendering)
Applied field, $H=1000$
Ratio $B_{fm}/B_r=1.6$ The crystals produced by Equation 2 of Example I were allowed to grow for the hereinafter specified various lengths of time instead of the 4 hours specified in Example I. Magnetic properties after processing in accordance with Example II were:

| Specimen | No. Days of Crystal Growth | Color | $H_c$ |
|---|---|---|---|
| B | 1/6 | light yellow | 340 |
| C | 1 | do | 290 |
| D | 2 | yellow | 275 |
| E | 5 | orange yellow | 230 |
| F | 8 | dark orange yellow | 220 |

The eight day crystals were about four times as large as the one day crystals. Preferred maximum dimensions of crystals are less than 1.5 microns and for a broader range less than 6 microns.

Although a temperature of 750° F. has been specified in the Example I for the temperature at which reduction by means of hydrogen is effected, the temperature may vary between a minimum of 500° F. and a maximum of about 1000° F. Between these two temperature limits, the times of treatment to effect reduction will depend upon the surface area of the particles, which, in turn, depends upon their fineness, the concentration of hydrogen in the reducing atmosphere and the concentration of water vapor in the reducing atmosphere. If water vapor or steam is mixed with the hydrogen in the reducing atmosphere, it helps to prevent over-baking, especially at the higher temperatures. Under-baked powder, indicated by its reddish color, has a low $B_r$. In fact, the $B_r$ value may be too low to allow determination of magnetic properties if the powder is under-baked. In order to save hydrogen gas and also reduce the hazard, the reducing process can be started and ended with ordinary illuminating gas, switching over to a hydrogen atmosphere when the proper baking temperature of between 500 and 1000° F. is reached.

If the reducing reaction is carried on for too long a time or at too high a temperature, the coercive force decreases, the ratio of $B_{fm}/B_r$ increases (which is undesirable), and the texture of the powder may be ruined due to the formation of lumps of large, hard particles. Ordinarily, if the temperature is kept within the limits of 500 to 1000° F., the time for the reaction to take place can be varied between ten minutes at the upper limit of temperature and 120 minutes or longer at the lower temperature limit.

In the following tables, as elsewhere herein, the magnetic properties were determined on coated strips, or tapes, prepared and calendered as described in Example II. Table I shows the variation of coercive force with reduction temperature:

*Table I*

| Specimen | Temp., °F. | Time | $H_c$ | Ratio: $B_{fm}/B_r$ at $H=1{,}000$ |
|---|---|---|---|---|
| G | 300 | 16½ hours | (underbaked) | |
| H | 400 | 120 min | do | |
| I | 500 | do | 550 | 2.3 |
| J | 700 | 30 min | 360 | 1.9 |
| K | 900 | do | 260 | 2.2 |
| L | 925 | do | 270 | 2.2 |
| M | 1,025 | do | 110 | 5.2 |
| N | 1,200 | do | 30 | 14.0 |

Table II indicates the variation of coercive values with the time of reduction:

*Table II*

| Specimen | Temp., °F. | Time | $H_c$ | Ratio: $B_{fm}/B_r$ at H=1,000 |
|---|---|---|---|---|
| P | 700 | 30 min | 360 | 1.9 |
| Q | 700 | 120 min | 180 | 3.0 |
| R | 915 | 15 hours | 140 | 5.1 |

The process of Example I may be varied in accordance with the following examples.

EXAMPLE III

Acicular crystals of $Fe_2O_3.H_2O$, as obtained by the reactions indicated by Equations 1 and 2 of Example I, were heated in air at temperatures between 500 and1550° F. to drive off the water of hydration. The crystalline structure was found to have changed from orthorhombic to hexagonal but with the crystalline form still acicular, while the color changed from light yellow to bright red. The particle size and shape were unchanged. The product so obtained had an analysis represented by the formula, $Fe_2O_3$.

The product so obtained was then subjected to the reducing and quenching steps described in connection with Example I. In general, the magnetic properties possessed by the final product of this example were approximately the same as those of the product produced by the process of Example I, although the coercive force, $H_c$, ran slightly higher.

This example indicates the feasibility of starting with the non-magnetic anhydrous form of ferric oxide, $Fe_2O_3$, rather than the hydrated form, $Fe_2O_3.H_2O$.

EXAMPLE IV

A product of Example I, identified as specimen S, and comprising a mixture of approximately 78.7% $Fe_3O_4$ and 19.3 $Fe_2O_3$, was placed in a shallow pan exposed to the air at a baking temperature of around 450° F. for ten hours or thereabouts. The particle size and shape of the product remained unchanged. The color was a light brown and the chemical analysis corresponded to that of $Fe_2O_3$. The magnetic properties of the product of this example were about the same as those of the previous examples, but with a higher $B_r$ and a lower ratio of $B_{fm}/B_r$, as indicated by the following table:

*Table III*

| Sample | Treatment | $H_c$ | $B_r$ | $B/_{fm}B_r$ at H=1,000 |
|---|---|---|---|---|
| S | before treatment | 330 | 438 | 1.9 |
| T | after reoxidation at 400° F | 330 | 500 | 1.4 |

Reaction takes place at temperatures of about 300° F. or even lower, but oxidation is slower at the lower temperatures. In the temperature range of from 400 to 600° F. much of the powder is oxidized in relatively few minutes if good aeration is provided. The oxidation should be carried out at the lowest temperatures consistent with economical processing time. Higher temperatures progressively reduce the magnetic qualities. For example, the powder of sample S when treated at higher temperatures gave the following results:

*Table IV*

| Sample | Treatment | $H_c$ | $B_r$ | $B_{fm}/B_r$ at H=1,000 |
|---|---|---|---|---|
| U | oxidized at 550° F | 310 | 400 | 1.4 |
| V | oxidized at 700° F | 300 | 260 | 1.6 |

When the temperature is raised to about 1050° F. the magnetic properties fall off rapidly and are entirely lost at about 1200° F.

Either the product of Example I or that of Example III could be reoxidized by baking while exposed to the air, as in Example IV. The baking temperature of 450° F. is typical but the temperature may be varied between 300 and 900° F. The ferric oxide product so produced is largely gamma $Fe_2O_3$.

Figure 1:
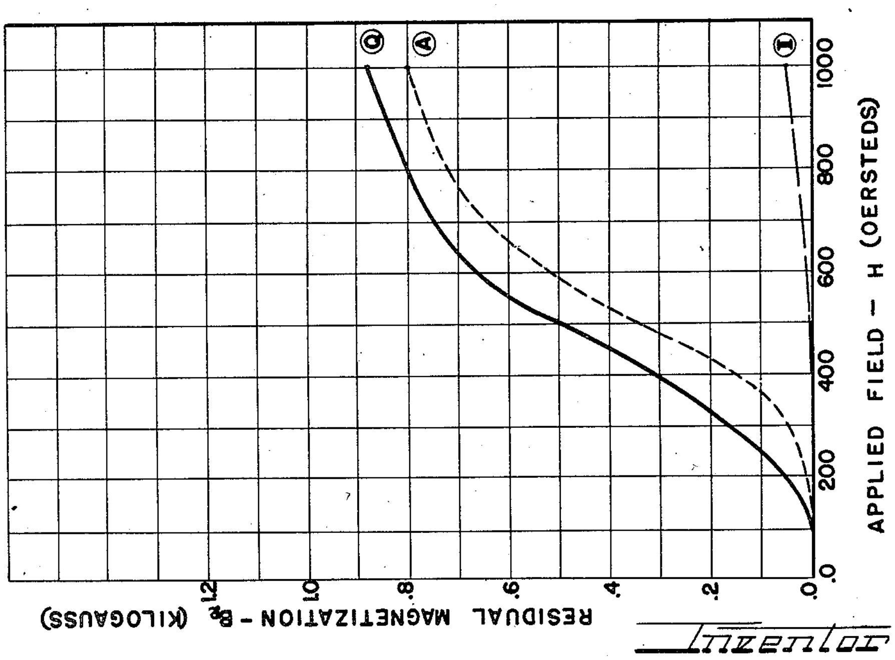
Fig. 1 is a graph representing values of residual magnetism, $B_r$, expressed in kilogauss plotted against values of applied field, H, expressed in oersteds for several samples of magnetic material embodying my invention.

In Fig. 1 the residual magnetism, $B_r$, in kilogauss has been plotted against applied field, H, in oersteds for specimens A, I and Q. The full line curve for specimen Q and the dash line curve for specimen I indicate that these specimens have residual magnetization values that are within the limits for the magnetic material of my invention, although the $B_r$ values for specimen I are on the low side. The dotted line curve for specimen A shows that the material represented by specimen A is of preferred magnetic qualities. It is desirable in order to prevent transfer that $B_r$ at fields below 250 should be less than 20% of saturation and preferably under 15%. The B values at an applied field of 2000 oersteds have been considered to be the saturation values. As will be seen from an inspection of Figure 1, the $B_r$—H characteristic which is typical of the magnetic material of my invention, and of the sound tracks formed from such compacted magnetic material, rises most rapidly at fields between 200 and 600 oersteds and relatively slowly at fields between 0 and 200 oersteds and at fields above 600 oersteds. It is this magnetic characteristic that reduces the tendency of the magnetic material to become affected by stray magnetic fields of relatively weak intensity, such as the stray fields set up by closely arranged turns of the magnetized record member.

Fig. 2 represents coercive force, $H_c$, plotted against applied field, H, for the same samples and again indicates the superior magnetic properties of specimen A. It will be noted that all three specimens have a coercive force in excess of 200 at field saturation. The limits for $H_c$ are from 200 to 550 and preferably from 275 to 400.

From the tables, it will be seen that these same samples A, I and Q have $B_{fm}$ to $B_r$ ratios at H=1000 of 1.6, 2.3 and 3.0, also within the upper limit of 3 to 1 previously mentioned.

Instead of effecting the reduction of $Fe_2O_3.H_2O$, or $Fe_2O_3$, by means of hydrogen gas, carbon monoxide gas may be used, or the ferric oxide may be reduced, by the use of other reducing agents, such as sulphur, sodium acetate, pyrogallol, and the like.

The following examples will serve to illustrate the use of these other reducing agents for reducing the ferric oxide used as starting material.

EXAMPLE V.—REDUCTION WITH PYROGALLOL

The $Fe_2O_3.H_2O$ of Example I was mixed with an excess of pyrogallol (about equal volumes of pyrogallol and ferric oxide) and heated gently to 400° F. for 15 minutes. The black residue was washed to remove excess pyrogallol. The dried material was then heated in the air to 700° F. to give a red material having a coercive force of 340 at a field of 2000 oersteds.

EXAMPLE VI.—REDUCTION WITH SULFUR

The $Fe_2O_3.H_2O$ of Example I was mixed with about 50% by weight of sulfur and the mixture heated to a temperature of about 800° F. Sulfur vapor formed above the mixture and excluded air. The black material formed as a result of the reaction was spread out into a thin layer and heated while exposed to air at a temperature of about 400° F. until it turned red. This yielded a material having an $H_c$ of 210 at a field of 2000 oersteds.

EXAMPLE VII. — REDUCTION WITH SODIUM ACETATE

The $Fe_2O_3.H_2O$ of Example I was mixed with an excess of sodium acetate (dry) and heated for 3 hours at about 750° F. The black product was mixed with water, filtered and washed. The resulting black powder had a coercive force of 215 at a field of 1000 oersteds.

EXAMPLE VIII.—REDUCTION WITH HYDROGEN

Crystals of $FeSO_4.7H_2O$ were heated in an enclosed chamber to 750° F. for ½ hour in an atmosphere of hydrogen. The powder so formed was cooled, filtered and washed with water. The residue had a coercive force of 200 at a field of 1000 oersteds.

The magnetic products of any of the above described examples may be used for coating or impregnating purposes in the manufacture of a magnetic impulse record member.

As a summary of typical magnetic properties of the magnetic iron oxides of my invention, the following table is given.

*Table V*

| Specimen | $H_c$ at (H=2,000) | $H_c$ at (H=1,000) | Sat. $B_r$[1] (H=2,000) | $B_r$ (H=1,000) | $B_r$ (H=250) | Ratio: $\frac{B_r(1,000)}{B_r(Sat.)}$ percent | Ratio: $\frac{B_r(250)}{B_r(Sat.)}$ percent | Ratio: $\frac{B_r(250)}{B_r(1,000)}$ percent | Ratio: $\frac{B_{fm}}{B_r}$ at H=1,000 |
|---|---|---|---|---|---|---|---|---|---|
| A | 370 | 340 | 912 | 800 | 14 | 87.7 | 1.54 | 1.75 | 1.9 |
| I | 540 | 400 | 75 | 45 | <2 | 60.0 | <2.67 | <4.5 | 2.33 |
| Q | 215 | 185 | 1055 | 880 | 108 | 83.5 | 10.2 | 12.3 | 3.0 |
| X | 360 | 330 | 775 | 710 | 17.8 | 92.0 | 2.3 | 2.5 | 1.43 |
| Y | 325 | 310 | 525 | 500 | 15 | 95.0 | 2.86 | 3.0 | 1.65 |
| W | 260 | 245 | 530 | 500 | 100 | 94.0 | 18.7 | 20.0 | 1.68 |

[1] Considered saturated at H=2,000.

In the foregoing Table V, specimen X was prepared from a different initial batch of starting material in the same way as specimen A but was reduced at a somewhat lower temperature within the range of from 500 to 1000° F. Specimens Y and W were likewise prepared from different initial batches of starting material but otherwise were both prepared in the same way as specimen T.

It will be noted from the column headed "Ratio $B_r(1000)/B_r(Sat.)$" that with the exception of specimen I, all specimens reported in the table show a ratio greater than 80%. Such a higher ratio is desirable for ease in magnetically erasing the record on the magnetic impulse record member.

Also, the column headed "Ratio $B_r(250)/B_r(Sat.)$" shows that all of the specimens reported exhibited less than 20% of saturation value, and all but specimen W less than 15% of saturation value, at fields below 250. It is desirable that $B_r$ at fields below 250 should be less than 20% and preferably less than 15% of saturation value in order to prevent the transfer of magnetism by reason of closely adjacent stray magnetic fields of relatively weak intensity. If my magnetic material did not posses this magnetic characteristic, portions of magnetized tape in a reel might magnetize adjacent unmagnetized turns of the tape and thus adversely affect the recording and reproducing fidelity of the tape.

The column headed "Ratio $B_{fm}/B_r(H=1000)$" shows that all of the specimens exhibited a ratio of 3 to 1 or less. This magnetic characteristic, as already explained, is important from the standpoint of better sensitivity and frequency response.

EXAMPLE IX

In this example, some of the magnetic $Fe_2O_3$ of specimen W, which had been produced by the method of Example IV followed by re-oxidation at 400° F., was re-reduced in accordance with the method of Example I. The coercive force was thereby increased from 260 to 405 at H=2000. This increase in coercive force indicates that the coercive force of a given sample of magnetic $Fe_3O_4$ or $Fe_2O_3$ can be improved by being repeatedly oxidized and reduced under the temperature conditions given herein.

The best prior art iron oxides that I have tested showed $B_{fm}/B_r$ ratios at H=1000 of around 4, and $H_c$ values at H=1000 of around 120. The superior magnetic properties of my magnetic iron oxide material are easily demonstrated by a comparison of the recording and reproducing performance of tapes made from such prior art iron oxides and my magnetic material.

I claim as my invention:

1. Ferromagnetic iron oxide adapted to form an element of a magnetic impulse record member, consisting essentially of uniformly small elongated crystals having characteristically in their as produced condition a length-to-width ratio of about 2.5 to 1 and higher of a synthetic ferrosoferric oxide, $Fe_3O_4$, formed from a non-magnetic iron oxide of the group consisting of alpha ferric oxide monohydrate and the anhydride thereof, said ferrosoferric oxide having a cubic crystal lattice and a coercive force, $H_c$, within the range of 290–360 oersteds.

2. Ferromagnetic iron oxide, adapted to form an element of a magnetic impulse record member consisting essentially of uniformly small elongated crystals having characteristically in their as produced condition a length-to-width ratio of about 2.5 to 1 and higher of a synthetic gamma ferric oxide, $Fe_2O_3$, formed from a non-magnetic iron oxide of the group consisting of alpha ferric oxide monohydrate and the anhydride thereof, said gamma ferric oxide having a cubic crystal lattice and a coercive force, $H_c$, within the range of 220–290 oersteds.

3. A ferromagnetic iron oxide material adapted to form an element of a magnetic impulse record member, said material consisting essentially of acicular crystalline particles uniformly small in size and not over 6 microns in their greatest dimension of a synthetic magnetic oxide of iron selected from the group consisting of magnetic ferrosoferric oxide, $Fe_3O_4$, and magnetic gamma ferric oxide, $Fe_2O_3$, the selected synthetic magnetic oxide of iron having a cubic lattice structure, and said material having a coercive force value of between 200 and 550 oersteds and a ratio of $B_{fm}/B_r$ at H=1000 of not over 3 to 1.

4. A magnetic impulse record member having a non-magnetic carrier and a magnetic impulse track adherently bonded thereto of magnetic material and a binder therefor, said magnetic material consisting essentially of a magnetic synthetic iron oxide selected from the group consisting of ferrosoferric oxide, $Fe_3O_4$, and gamma ferric oxide, $Fe_2O_3$, said selected iron oxide being of a uniformly small particle size less than 6 microns in greatest dimension and having a coercive force of between 200 and 550 oersteds, said track having a rapid rate of rise in $B_r$ for applied fields between about 200 and about 600 oersteds and a relatively slower rate of rise in $B_r$ for applied fields below 200 and above 600 oersteds.

5. A magnetic impulse record member having a non-magnetic carrier and a coating adherently bonded thereto of magnetic material and a binder therefor, said magnetic material consisting essentially of a magnetic synthetic iron oxide selected from the group consisting of ferrosoferric oxide, $Fe_3O_4$, and gamma ferric oxide, $Fe_2O_3$, formed from a non-magnetic iron oxide of the group consisting of alpha ferric oxide monohydrate and the anhydride thereof, said selected iron oxide being in crystalline form of a uniformly small size less than 6 microns in greatest dimension and having a coercive force of between 200 and 550 oersteds, said magnetic material having a $B_r$ versus H characteristic that rises most rapidly at fields between 200 and 600 oersteds and relatively slowly at fields between 0 and 200 oersteds and at fields above 600 oersteds.

6. As a new article of manufacture, a magnetic impulse record member comprising a thin, flexible, non-magnetic support, and adhered thereon, a layer of a magnetic synthetic iron oxide selected from the group consisting of ferrosoferric oxide, $Fe_3O_4$, and gamma ferric oxide, $Fe_2O_3$, formed from a non-magnetic iron oxide of the group consisting of alpha ferric oxide monohydrate and the anhydride thereof, said selected iron oxide in its as-produced condition being in the form of elongated particles having characteristically a length-to-width ratio of about 2.5 to 1 and higher and being of acicular crystalline form and of a uniformly small particle size less than six microns in greatest dimension and having a coercive force of between 200 and 550 oersteds.

7. The method of making permanent magnet material, which comprises precipitating a non-magnetic ferric oxide from solution in fine crystalline form, heating said non-magnetic ferric oxide in a reducing hydrogen atmosphere to a temperature of between 500 and 1000° F. for a sufficient length of time to reduce said ferric oxide to a magnetic ferrosoferric oxide having a coercive force of over 200 oersteds and a $B_{fm}/B_r$ (H=1000) of not over 3 to 1.

8. The method of making permanent magnet material, which comprises precipitating a non-magnetic ferric oxide from solution in acicular crystalline form, heating said non-magnetic ferric oxide in a reducing hydrogen atmosphere to a temperature of about 750° F. for a sufficient length of time to reduce said ferric oxide to a magnetic ferrosoferric oxide, cooling the ferrosoferric oxide in the presence of a reducing atmosphere to room temperature and then exposing said ferrosoferric oxide to the air to recover a ferrosoferric oxide having a coercive force value between 200 and 550.

9. The method of making magnetic material, which comprises precipitating a non-magnetic ferric oxide from solution in acicular crystalline form and of a particle size less than 6 microns in greatest dimension, heating said non-magnetic ferric oxide to a temperature between 500 and 1000° F. in a reducing atmosphere until the reduced oxide turns almost black, stopping the reaction at that point by cooling said reduced oxide in a reducing atmosphere to around room temperature and recovering ferrosoferric oxide of the same crystalline form and same order of particle size but having permanent magnet properties including a coercive force of over 200 oersteds and a $B_{fm}/B_r$ (H=1000) of not over 3 to 1.

10. The method of making magnetic material, which comprises precipitating a non-magnetic ferric oxide from solution in acicular crystalline form and of a particle size less than 6 microns in greatest dimension, heating said non-magnetic ferric oxide to a temperature between 500 and 1000° F. in a reducing atmosphere until the reduced oxide turns almost black, stopping the reaction at that point by cooling said reduced oxide in a reducing atmosphere to around room temperature and recovering ferrosoferric oxide of the same crystalline form and same order of particle size but having permanent magnet properties including a coercive force of over 200 oersteds and a $B_{fm}/B_r$ (H=1000) of not over 3 to 1 and reoxidizing said ferrosoferric oxide in the presence of oxygen at a temperature between 300° F. and 900° F. to produce a magnetic iron oxide consisting essentially of gamma $Fe_2O_3$.

11. The method of making permanent magnet material, which comprises precipitating a non-magnetic ferric oxide from solution in acicular crystalline form and of a particle size less than 6 microns, subjecting said non-magnetic ferric oxide to successive reducing, oxidizing, re-reducing and re-oxidizing steps to produce a magnetic material consisting essentially of gamma ferric oxide and having magnetic properties including a coercive force of over 200 oersteds and a $B_{fm}/B_r$ (H=1000) of not over 3 to 1, the reducing steps being carried out in a reducing hydrogen atmosphere at a temperature between 500 and 1000° F. and the oxidizing steps being carried out in the presence of oxygen at a temperature between 300 and 900° F.

12. The method of making permanent magnet material, which comprises growing acicular crystals of $Fe_2O_3.H_2O$ from solution of a particle size of less than 6 microns in greatest dimension, heating said crystals in the air to a temperature between 500 and 1550° F. to drive off the water of hydration, reducing said dehydrated crystals at a temperature between 500 and 1000° F. in a gaseous reducing atmosphere and cooling in a gaseous reducing atmosphere to obtain a magnetic material also in acicular crystalline form and of a particle size less than 6 microns and consisting essentially of $Fe_3O_4$ particles having a coercive force value of at least 200 oersteds and a $B_{fm}/B_r$ (H=1000) of not over 3 to 1.

13. The method of making magnetic iron oxide which comprises providing a synthetic non-magnetic ferric oxide in crystalline form and of a particle size not over 6 microns in its greatest dimension and reducing said non-magnetic oxide at elevated temperature to produce a ferrosoferric oxide having permanent magnet properties including a coercive force of at least 200 oersteds.

14. The method of making magnetic iron oxide which comprises providing a synthetic non-magnetic ferric oxide in acicular crystalline form and of particle size not over 6 microns in its greatest dimension, reducing said non-magnetic oxide at elevated temperatures to produce a ferrosoferric oxide and oxidizing said ferrosoferric oxide to gamma ferric oxide having permanent magnet properties including a coercive force of at least 200 oersteds.

15. The method of improving the magnetic properties of a synthetic gamma ferric oxide produced by the method of claim 14, which comprises reducing said gamma ferric oxide in a hydrogen atmosphere at about 750° F. and recovering an almost black iron oxide of higher coercive force than that of said gamma ferric oxide.

16. The method of making permanent magnet material, which comprises providing a synthetic non-magnetic ferric oxide in the form of fine elongated crystals of a length-to-width ratio of about 2.5 to 1 and greater and of less than 6 microns maximum dimension, heating said non-magnetic ferric oxide under reducing conditions at a sufficiently high temperature and for a sufficient length of time to reduce said ferric oxide to a ferrosoferric oxide also of elongated crystalline form but having permanent magnet properties including a coercive force of at least 200 oersteds.

17. The method as defined in claim 16, wherein the reduction is carried out in the presence of pyrogallol.

18. The method as defined in claim 16, wherein the reduction is carried out in the presence of sulphur.

19. The method of making permanent magnet material, which comprises providing a synthetic non-magnetic ferric oxide in the form of fine crystals of less than 6 microns maximum dimension, heating said non-magnetic ferric oxide in a reducing atmosphere of hydrogen at a sufficiently high temperature and for a sufficient length of time to reduce said ferric oxide to ferrosoferric oxide also in the form of fine crystals, stopping the reducing action at a point at which the said ferrosoferric oxide has a coercive force of over 200 oersteds and a $B_{fm}/B_r$ (H=1000) of not over 3 to 1, and recovering said ferrosoferric oxide having such magnetic properties.

20. The method of making permanent magnet material, which comprises subjecting material initially consisting essentially of a synthetic non-magnetic ferric oxide having a particle size not over 6 microns in maximum dimension to successive reducing, oxidizing, re-reducing and re-oxidizing steps to produce a magnetic material consisting essentially of gamma ferric oxide and having magnetic properties including a coercive force of over 200 oersteds and a $B_{fm}/B_r$ (H=1000) of not over 3 to 1, the reducing steps being carried out in a reducing hydrogen atmosphere at a temperature between 500 and 1000° F. and the oxidizing steps being carried out in the presence of oxygen at a temperature between 300 and 900° F.

21. The method of making permanent magnet material, which comprises precipitating crystals of $Fe_2O_3.H_2O$ from solution of a particle size of less than 6 microns in greatest dimension, heating said crystals in the air to a temperature between 500 and 1550° F. to drive off the water of hydration, reducing said dehydrated crystals at a temperature between 500 and 1000° F. in a gaseous reducing atmosphere and cooling in a gaseous reducing atmosphere to obtain a magnetic material also in crystalline form and of a particle size less than 6 microns and consisting essentially of $Fe_3O_4$ particles having a coercive force value of at least 200 oersteds and a $B_{fm}/B_r$ (H=1000) of not over 3 to 1.

22. The method of making magnetic material which comprises providing a synthetic non-magnetic ferric oxide in the form of fine crystals having a particle size of less than 1.5 microns in greatest dimension, heating said non-magnetic ferric oxide to a temperature between 500 and 1000° F. in a reducing atmosphere to form a ferrosoferric oxide, stopping said heating at a point where said ferrosoferric oxide has a coercive force of over 200 oersteds and a $B_{fm}/B_r$ (H=1000) of not over 3 to 1; cooling said ferrosoferric oxide in a reducing atmosphere to about room temperature, and recovering said ferrosoferric oxide in the form of fine crystals having a particle size of less than 1.5 microns in greatest dimension and having the aforesaid magnetic properties.

23. A method of making permanent magnet material, which comprises providing a synthetic non-magnetic ferric oxide in the form of fine elongated crystals of a length-to-width ratio of about 2.5 to 1 and greater and of less than 6 microns maximum dimension, heating said non-magnetic ferric oxide in a reducing atmosphere at a sufficiently high temperature and for a sufficient length of time to reduce said ferric oxide to a ferrosoferric oxide also of elongated crystalline form but having permanent magnet properties including a coercive force of at least 200 oersteds, and heating said ferrosoferric oxide exposed to the air at a sufficiently high temperature and for a sufficient length of time to oxidize said ferrosoferric oxide to gamma ferric oxide having a coercive force of between 200 and 550 oersteds.

24. The method of making permanent magnet material, which comprises providing a synthetic non-magnetic ferric oxide in the form of fine elongated crystals of less than 6 microns maximum dimension, heating said non-magnetic ferric oxide in a reducing atmosphere selected from the group consisting of hydrogen, carbon monoxide and mixtures thereof at a sufficiently high temperature and for a sufficient length of time to reduce said ferric oxide to a ferrosoferric oxide; subjecting said ferrosoferric oxide in the presence of oxygen at a sufficiently high temperature and for a sufficient length of time to oxidize said ferrosoferric oxide to gamma ferric oxide having permanent magnet properties including a coercive force of at least 200 oersteds and recovering such gamma ferric oxide.

25. Ferromagnetic iron oxide selected from the group consisting of a synthetic ferrosoferric oxide, $Fe_3O_4$, and of a synthetic gamma ferric oxide, $Fe_2O_3$, adapted to form an element of a magnetic impulse record member, said iron oxide consisting essentially of uniformly small elongated crystals of less than about 1.5 microns maximum dimension having a length-to-width ratio of about 2.5 to 1 and higher, and having a cubic crystal lattice structure and a coercive force, $H_c$, within the range of 245 to 330 and remanence, $B_r$, of above about 500 gauss.

26. A magnetic impulse record member having a non-magnetic carrier and a coating adherently bonded thereto of a binder and magnetic material, said magnetic material being the ferromagnetic iron oxide defined in claim 25 and having a $B_r$ versus H characteristic that rises most rapidly at fields between 200 and 600 oersteds and relatively slowly at fields between 0 and 200 oersteds and at fields above 600 oersteds.

References Cited in the file of this patent

UNITED STATES PATENTS

| Number | Name | Date |
|---|---|---|
| 1,368,748 | Penniman et al. | Feb. 15, 1921 |
| 1,392,927 | Fireman | Oct. 11, 1921 |
| 1,840,286 | Hochheim | Jan. 5, 1932 |
| 1,889,380 | Ruben | Nov. 29, 1932 |
| 1,894,749 | Baudisch | Jan. 17, 1933 |
| 1,894,750 | Baudisch | Jan. 17, 1933 |
| 2,127,907 | Fireman | Aug. 23, 1938 |
| 2,133,267 | Ayers | Oct. 18, 1938 |
| 2,330,553 | Butler | Sept. 28, 1943 |
| 2,339,793 | Moeklebust | Jan. 25, 1944 |
| 2,365,720 | Neighbors | Dec. 6, 1944 |
| 2,388,659 | Ryan | Nov. 6, 1945 |
| 2,418,467 | Ellis | Apr. 8, 1947 |

FOREIGN PATENTS

| Number | Country | Date |
|---|---|---|
| 394,810 | Great Britain | July 6, 1933 |
| 459,884 | Great Britain | Jan. 18, 1937 |
| 466,023 | Great Britain | May 18, 1937 |
| 511,164 | Great Britain | Oct. 28, 1937 |
| 500,900 | Germany | June 26, 1930 |

OTHER REFERENCES

Mellor: Comp. Treatise on Inorg. Chem., vol. 13, pages 732, 736, 740, 741, 780, 785, 786–788, Longmans, Green and Co., N. Y., 1934.

Gottschalk, "Coercive Force of Magnetite Powder," U. S. Bureau of Mines Bulletin 425, "Magnetic Separation of Ores," pages 88–95, published 1941 by U. S. Q. R. O., Wash., D. C.

Welo and Baudisch, "Chemical Reviews," vol. 15, August 1934, pages 45–97.